US012515877B1

(12) United States Patent
Giraldo

(10) Patent No.: US 12,515,877 B1
(45) Date of Patent: Jan. 6, 2026

(54) TRASH RECEPTACLE WITH SUPPORT STAND AND BAG SUPPLY

(71) Applicant: Margarita Giraldo, Miami, FL (US)

(72) Inventor: Margarita Giraldo, Miami, FL (US)

( * ) Notice: Subject to any disclaimer, the term of this patent is extended or adjusted under 35 U.S.C. 154(b) by 0 days.

(21) Appl. No.: 18/432,235

(22) Filed: Feb. 5, 2024

Related U.S. Application Data

(60) Provisional application No. 63/446,713, filed on Feb. 17, 2023.

(51) Int. Cl.

| | |
|---|---|
| ***B65F 1/14*** | (2006.01) |
| ***B65F 1/00*** | (2006.01) |
| ***B65F 1/06*** | (2006.01) |
| ***B65F 1/16*** | (2006.01) |

(52) U.S. Cl.
CPC ............ *B65F 1/0033* (2013.01); *B65F 1/062* (2013.01); *B65F 1/141* (2013.01); *B65F 1/1473* (2013.01); *B65F 1/1646* (2013.01)

(58) Field of Classification Search
CPC ........ B65F 1/141; B65F 1/0033; B65F 1/062; B65F 1/1646; B65F 1/004; B65F 1/1426
USPC .......................................... 220/909, 503, 554
See application file for complete search history.

(56) References Cited

U.S. PATENT DOCUMENTS

| | | | | |
|---|---|---|---|---|
| 818,241 | A * | 4/1906 | Fullwood | |
| 2,582,906 | A * | 1/1952 | Heldenbrand | B65F 1/141 211/78 |
| 2,644,737 | A | 7/1953 | Davis | |
| 4,860,910 | A * | 8/1989 | Zipper | A47G 29/06 220/521 |
| 5,242,220 | A * | 9/1993 | Sandreth | B65F 1/004 D34/1 |
| 10,279,996 | B2 | 5/2019 | Yang | |
| 2001/0052522 | A1 * | 12/2001 | Forest | B65D 25/14 220/495.07 |

* cited by examiner

*Primary Examiner* — Stephen J Castellano
(74) *Attorney, Agent, or Firm* — Sanchelima & Associates, P.A.; Jesus Sanchelima; Christian Sanchelima

(57) ABSTRACT

A trash receptacle integrates a container assembly, bag container assembly, trash compartment assembly, and support assembly. This system forms multiple compartments for organized storage of cleaning supplies and efficient trash disposal. The bag container assembly, located within a second compartment, functions as a storage unit for manually dispensing trash bag rolls through an opening. The trash compartment assembly features a user-friendly drawer for easy trash disposal. Height adjustability, facilitated by a support and slidable support, ensures ergonomic interaction with the container assembly, trash compartment assembly, and bag container assembly, eliminating the need for users to bend over during use.

11 Claims, 4 Drawing Sheets

TRASH RECEPTACLE WITH SUPPORT STAND AND BAG SUPPLY

II. BACKGROUND OF THE INVENTION

1. Other Related Applications

Figure 1:
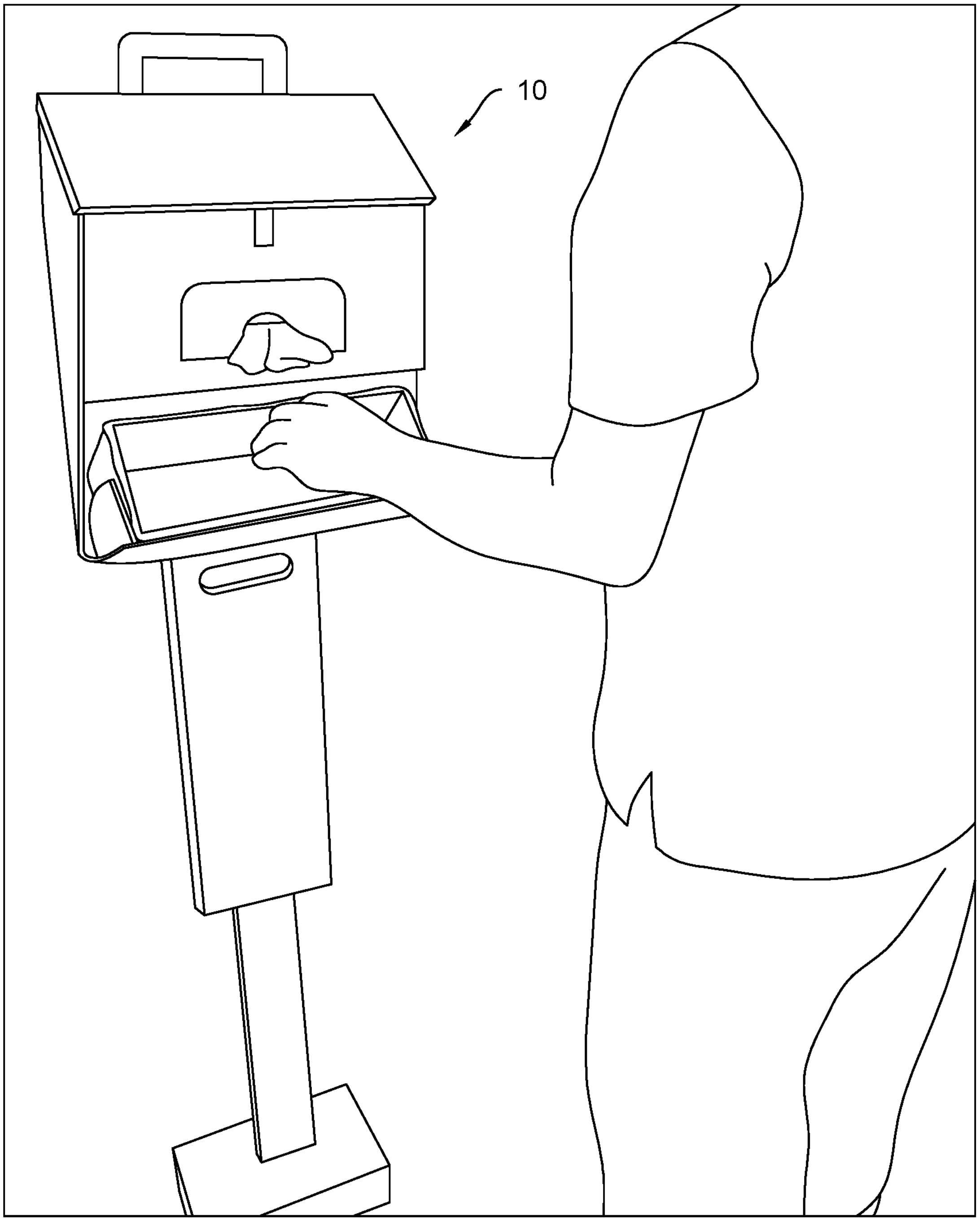

The present application is a U.S. Non-Provisional Patent Application of a Provisional. Patent Application No. 63/446,713, filed on Feb. 17, 2023, which is hereby incorporated by reference.

2. Field of the Invention

The present invention relates to a receptacle and, more particularly, to a trash receptacle that includes a container assembly, which includes a plurality of suitable containers for disposing of trash or storing any other suitable cleaning supplies. The present invention further includes a support assembly to adjust the height of the containers, allowing the user to set the containers at a predetermined height.

3. Description of the Related Art

Several designs for trash receptacles have been designed in the past. None of them, however, include an adjustable set of containers, where each container is intended for a different purpose such as a trash receptacle, bag container, or storage for cleaning supplies. Each container is covered by a hinged cover, allowing the user to separate, store, and keep organized each compartment. The adjustable support allows the user to set the containers at a predetermined height, preventing the user from having to bend over.

Applicant believes that a related reference corresponds to U.S. Pat. No. 10,279,996 issued for receptacle with low friction and low noise motion damper for lid. Applicant believes that another related reference corresponds to U.S. Pat. No. 2,644,737 issued for waste receptacle. None of these references, however, teach of an adjustable container at a predetermined height, including a plurality of suitable containers for cleaning and trash disposal purposes. This embodiment includes a bag compartment integrated into a compartment cover, allowing for the dispensing of bags as needed.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide an adjustable height device that prevents the user from having to bend over.

It is another object of this invention to provide a device with a set of compartments which are intended for cleaning supplies storage and trash disposal purposes.

It is still another object of the present invention to provide a device that includes covers for each compartment, allowing for the separation and well organization of each compartment.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an operational view of an exemplary embodiment of the present invention 10.

Figure 2:
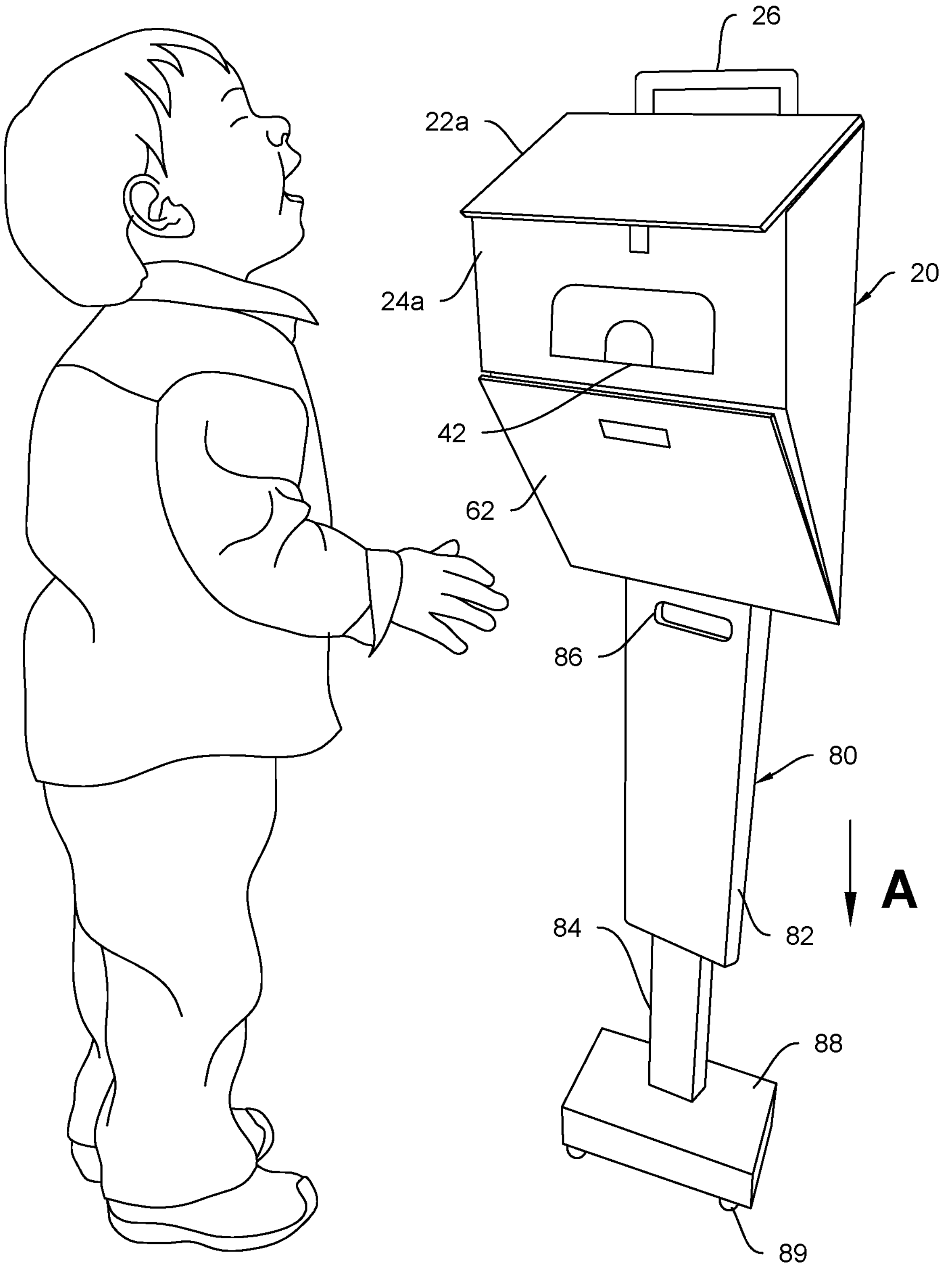

FIG. 2 shows an isometric view of the container assembly 20, wherein the container assembly 20 is adjusted in a lower height caused by the interaction of the slidable support 84 being introduced within the support 82.

Figure 3:
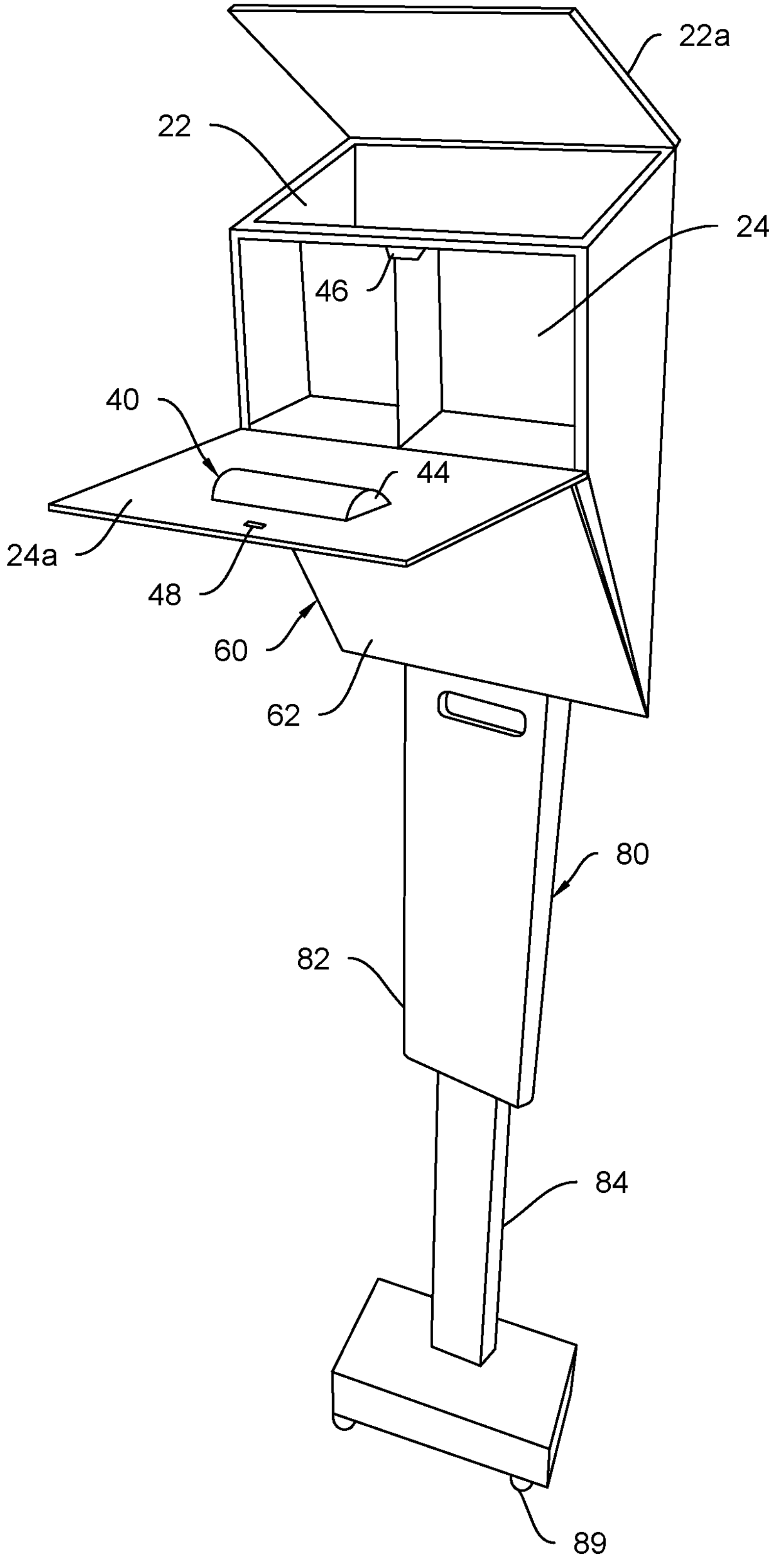

FIG. 3 illustrates an isometric view of the present invention 10, wherein the support assembly 80 has been adjusted in a higher position, allowing the user to interact with the container assembly 20, bag container assembly 40, and trash compartment assembly 60 without having to bend over.

Figure 4:
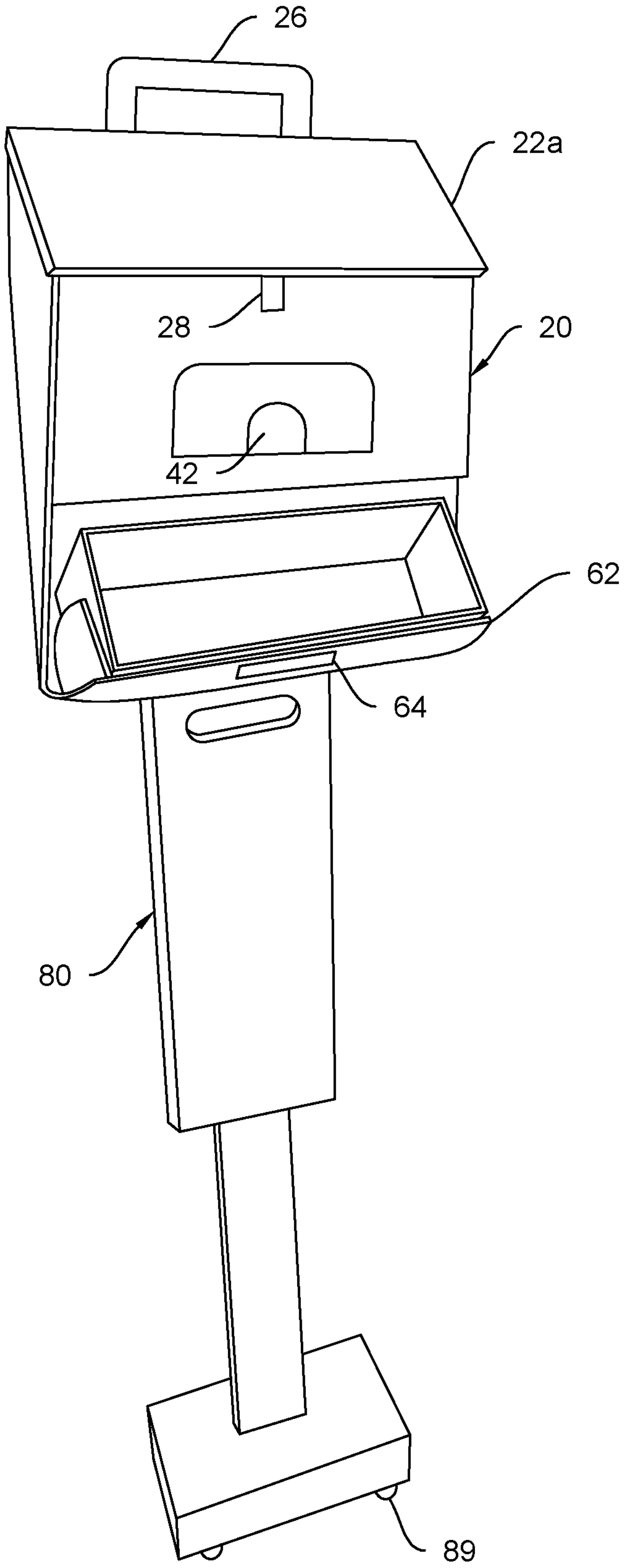

FIG. 4 is a representation of an isometric view of the present invention 10, wherein the drawer 62 is hingedly fixed below the container assembly, providing a compartment for trash disposal purposes.

V. DETAILED DESCRIPTION OF THE EMBODIMENTS OF THE INVENTION

Referring now to the drawings, where the present invention is generally referred to with numeral 10, it can be observed that it basically includes a container assembly 20, a bag container assembly 40, a trash compartment assembly 60, and a support assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

In a preferred embodiment, the container assembly comprises a first compartment 22, a second compartment 24, a handle 26, and a second handle 28. As illustrated in FIG. 3, the first compartment 22, second compartment 24, and a drawer 62 are integrated to form a set of multiple compartments, enabling users to systematically organize and separate cleaning supplies for efficient storage and trash disposal purposes. In a suitable embodiment, the first compartment 22 is positioned at the upper side of the second compartment 24. The first compartment includes a first cover **22*a* hingedly attached, allowing it to function as a well-covered receptacle for storage purposes. In one embodiment, the second compartment 24 is situated below the first compartment 22 and is equipped with a second cover 24*a* hingedly attached vertically to the second compartment 24. As depicted in FIG. 2, the second compartment creates a chamber adapted for storage purposes, providing the option to include separation walls for maintaining a well-organized arrangement of cleaning supplies. FIG. 2 illustrates the handle 26 fixed at the rear top side of the first compartment 22. This handle 26 facilitates the lifting and carrying of the container assembly 20** by the user.

In a suitable embodiment, the bag container assembly 40 includes an opening 42, a third compartment 44, a locking tab 46, and a locking member 48. In one embodiment, opening 42 is integrated into the second cover **24*a*, creating direct access to the third compartment 44, as illustrated in FIG. 2 and FIG. 3. In a preferred embodiment, third compartment 44 is attached to the rear side of the second cover 24***a*, wherein third compartment 44 has a suitable shape to store cleaning supplies, such as trash bag rolls. It should be considered that third compartment 44 is hingedly attached to the second cover 24*a* or removably attachable to thereof, allowing the user to replace said trash bag rolls. In one embodiment of the present invention 10, FIG. 3 teaches of the locking tab 46 protruding downwardly from a top side of the second compartment 24 and the locking member 48 fixed on a rear top side of the second cover 24*a*, which both the locking tab 46 and the locking member 48 match when closing the second cover 24*a*. It should be considered that locking tab 46 and locking member 48 create a locking mechanism that allows the second cover 24*a* to be kept in a closed configuration. It should be considered that locking tab 46 and locking member 48 integrate magnets, hook and loop fastener, or any other suitable fastener to keep the second cover 24*a* in a closed configuration and being opened through a second handle located on the front side of the second cover 24*a*, as FIG. 4 and FIG. 2 depicts.

In an exemplary embodiment, the trash compartment assembly 60 contains the drawer 62 and a third handle 64. In a suitable embodiment, the drawer 62 has a slanted configuration, providing a tip-out drawer type, as observed in FIG. 4. In one embodiment, the drawer 62 forms a suitable compartment for trash disposal purposes, with the opening and closing facilitated through the third handle 64 located on the front side of the drawer.

In a preferred embodiment, the support assembly 80 comprises a support 82, a slidable support 84, a second opening 86, and a base 88. In one embodiment of the present invention 10, the support 82 is integrally attached to the container assembly 20 and/or the trash compartment assembly 60 to provide stability. In combination with the slidable support 84 and the base 88, it forms a stand support. As shown in FIG. 2 and FIG. 3. The container assembly 20 and trash compartment assembly 60 can be adjusted in height due to the interaction of the slidable support 84 with respect to the support 82, wherein the support 82 is configured to receive the slidable support 84. This configuration enables the support 82 to be adjusted in height and held in place due to the friction between the support 82 and the slidable support 84. A suitable mechanism may be integrated into the support 82 and the slidable support 84 to allow users to adjust the support 82 to a predetermined height. This adjustable height feature is adjusted to facilitate direct interaction with the container assembly 20, the bag container assembly 40, and the trash compartment assembly 60 without requiring users to bend over, as depicted in FIG. 1. In an exemplary embodiment, the second opening 86 is integrally formed in the support 82, located proximal to the top side of the support 82, as represented in FIG. 4. In a suitable embodiment, the second opening 86 is configured to provide support for the user's hand, allowing them to lift or lower the support 82 as needed. In a preferred embodiment, the base 88 is attached to the bottom side of the second opening 86. The container assembly 20 and trash compartment assembly 60, configured to store cleaning supplies and facilitate trash disposal, apply weight downwardly. Therefore, the base 88 is shaped and sized appropriately to maintain the present invention 10 in a vertical position, preventing it from falling due to the center of gravity caused by the stored supplies' weight. In a suitable embodiment, support assembly 80 further includes wheel 89 integrated beneath the support 82, as best illustrated in FIG. 2. It should be considered that wheels 89 are embedded within the support 82, wherein a portion of the wheels 89 protrudes beyond the bottommost side of the support 82 to provide mobility to the present invention 10. This configuration allows the present invention 10 to be orientated in a predetermined position, facilitating the interaction of the user with the drawer 62, first compartment 22, second compartment 24, and third compartment 44.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A trash receptacle set, comprising of:

a container assembly including a first compartment and a second compartment, wherein said second compartment is integrated below said first compartment, said first compartment and said second compartment includes a first cover and a second cover respectively, said first compartment further includes a handle in a top rear side thereof; said second cover further includes a second handle in a front side thereof;

a bag container assembly containing an opening, a third compartment, a locking tab, and a locking member, wherein said third compartment is attached at a rear side of said second cover, said opening is located in said second cover, wherein said locking member is placed at a top side of said rear side of said second cover, said locking tab protrudes downwardly from a top side of said second compartment;

a trash compartment having a drawer, wherein said drawer is integrated below said second compartment, said drawer includes a third handle in a front side thereof; and a support assembly including a support, a slidable support, and a base, wherein said support integrates said slidable support therein, said support includes a second opening integrally formed at a proximal top side thereof, said base is fixed at a bottom side of said slidable support.

2. The trash receptacle set for in claim 1, wherein said first cover and said second cover are hingedly attached to said first compartment and said second compartment, respectively.

3. The trash receptacle set for in claim 1, wherein said first compartment and said second compartment are receptacles for receiving and storing cleaning supplies.

4. The trash receptacle set for in claim 1, wherein said opening creates an access to said third compartment.

5. The trash receptacle set for in claim 1, wherein said third compartment has a suitable shape to store trash bag rolls, where each trash bag is dispensed manually through said opening.

6. The trash receptacle set for in claim 1, wherein said locking tab and said locking member create a locking mechanism to keep said second cover in a closed configuration.

7. The trash receptacle set for in claim 1, wherein said drawer has a slanted configuration, creating a tip-out type drawer.

8. The trash receptacle is set for in claim 1, wherein said support is adjustable in height due to a sliding interaction with respect to said slidable support.

9. The trash receptacle set for in claim 1, wherein said base is appropriately sized to prevent said container assembly from tipping due to a center of gravity resulting from said weight of said cleaning supplies stored within said container assembly.

10. A trash receptacle, comprising of:

a container assembly including a first compartment and a second compartment, wherein said second compartment is integrated below said first compartment, said first compartment and said second compartment includes a first cover and a second cover respectively, said first compartment further includes a handle in a top rear side thereof; said second cover further includes a second handle in a front side thereof;

a bag container assembly containing an opening, a third compartment, a locking tab, and a locking member, wherein said third compartment is attached at a rear side of said second cover, said opening is located in said second cover, wherein said locking member is placed at a top side of said rear side of said second cover, said locking tab protrudes downwardly from a top side of said second compartment, said third compartment has a suitable shape to store trash bag rolls, where each trash bag is dispense manually though said opening; wherein said first cover and said second cover are hingedly attached to said first compartment and said second compartment respectively, said opening creates an access directly to said third compartment;

a trash compartment having a drawer, wherein said drawer is integrated below said second compartment, said drawer includes a third handle in a front side thereof, said drawer has a slanted configuration, creating a tip-out type drawer; and a support assembly including a support, a slidable support, and a base, wherein said support integrates said slidable support therein, said support includes a second opening integrally formed at a proximal top side thereof, said base is fixed at a bottom side of said slidable support, said support is adjustable in height due to a sliding interaction with respect to said slidable support.

11. A trash receptacle, consisting of:

a container assembly including a first compartment and a second compartment, wherein said second compartment is integrated below said first compartment, said first compartment and said second compartment includes a first cover and a second cover respectively, said first compartment further includes a handle in a top rear side thereof; said second cover further includes a second handle in a front side thereof;

a bag container assembly containing an opening, a third compartment, a locking tab, and a locking member, wherein said third compartment is attached at a rear side of said second cover, said opening is located in said second cover, wherein said locking member is placed at a top side of said rear side of said second cover, said locking tab protrudes downwardly from a top side of said second compartment, said third compartment has a suitable shape to store trash bag rolls, where each trash bag is dispense manually though said opening, said locking tab and said locking member create a locking mechanism to keep said second cover in a closed configuration;

wherein said first cover and said second cover are hingedly attached to said first compartment and said second compartment respectively, said opening creates an access directly to said third compartment, said first compartment and said second compartment are receptacles to receive and store cleaning supplies;

a trash compartment having a drawer, wherein said drawer is integrated below said second compartment, said drawer includes a third handle in a front side thereof, said drawer has a slanted configuration, creating a tip-out type drawer; and a support assembly including a support, a slidable support, and a base, wherein said support integrates said slidable support therein, said support includes a second opening integrally formed at a proximal top side thereof, said base is fixed at a bottom side of said slidable support, said support is adjustable in height due to a sliding interaction with respect to said slidable support, said base is appropriately sized to prevent said container assembly from tipping due to a center of gravity resulting from said weight of said cleaning supplies stored within said container assembly, said support assembly further includes wheels attached beneath said support.

* * * * *